(12) United States Patent
Lin et al.

(10) Patent No.: US 12,531,112 B2
(45) Date of Patent: Jan. 20, 2026

(54) MEMORY DEVICE AND OPERATING METHOD THEREOF

(71) Applicant: MACRONIX INTERNATIONAL CO., LTD., Hsinchu (TW)

(72) Inventors: Yu-Hsuan Lin, Taichung (TW); Yu-Yu Lin, New Taipei (TW); Feng-Min Lee, Hsinchu (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 265 days.

(21) Appl. No.: 18/469,613

(22) Filed: Sep. 19, 2023

(65) Prior Publication Data

US 2025/0095720 A1    Mar. 20, 2025

(51) Int. Cl.
  G11C 11/4096  (2006.01)
  G11C 11/4091  (2006.01)
  G11C 11/4094  (2006.01)

(52) U.S. Cl.
  CPC ...... *G11C 11/4096* (2013.01); *G11C 11/4091* (2013.01); *G11C 11/4094* (2013.01)

(58) Field of Classification Search
  CPC ................................................ G11C 11/4094
  USPC .................................................... 365/185.17
  See application file for complete search history.

(56) References Cited

U.S. PATENT DOCUMENTS

| | | | |
|---|---|---|---|
| 5,646,903 A | 7/1997 | Johnson | |
| 6,314,017 B1 | 11/2001 | Emori | |
| 2002/0131294 A1* | 9/2002 | Forbes | G11C 11/412 365/154 |
| 2004/0252542 A1 | 12/2004 | Hoya | |
| 2005/0146921 A1* | 7/2005 | Ye | G11C 11/405 365/149 |
| 2010/0165704 A1* | 7/2010 | Wu | G11C 11/416 365/189.011 |
| 2022/0383657 A1* | 12/2022 | Inoue | H04N 23/60 |

FOREIGN PATENT DOCUMENTS

| | | |
|---|---|---|
| CN | 101004952 A | 7/2007 |
| WO | 2020150810 A1 | 7/2020 |

OTHER PUBLICATIONS

X. Duan et al., "Novel Vertical Channel-All-Around(CAA) IGZO FETs for 2T0C DRAM with High Density beyond 4F2 by Monolithic Stacking", 2021 IEEE, IEDM21-222 to IEDM21-225. (ref. 01, file attached).

* cited by examiner

*Primary Examiner* — Anthan Tran
(74) *Attorney, Agent, or Firm* — McClure, Qualey & Rodack, LLP (57) ABSTRACT

A memory device includes a first memory cell performing a logic operation. The first memory cell includes first and second switches. The first switch writes a first weight bit into a first storage node. The second switch generates a first current signal according to the first weight bit and a first input bit. The second switch receives a first bit line signal carrying the first input bit and a first word line signal. A control terminal of the second switch is coupled to the first storage node. When the first input bit has a first logic value, the first bit line signal and the first word line signal has a first voltage level. When the first input bit has a second logic value, the first bit line signal has a second voltage level smaller than the first voltage level.

20 Claims, 7 Drawing Sheets

MEMORY DEVICE AND OPERATING METHOD THEREOF

BACKGROUND

Technical Field

The present disclosure relates to a memory technology. More particularly, the present disclosure relates to a memory device and an operating method of a memory device.

Description of Related Art

A memory device includes multiple memory cells configured to store data bits. A memory cell can be implemented by architecture of two transistors. A data bit can be stored in a storage node where the two transistors coupled to each other. During a read operation a logic value of the data bit can be determined according to a current signal flowing through the memory cell.

SUMMARY

The present disclosure provides a memory device. The memory device includes a first memory cell. The first memory cell configured to perform a logic operation according to a first weight bit and a first input bit. The first memory cell includes a first switch and a second switch. The first switch configured to write the first weight bit into a first storage node. The second switch configured to generate a first current signal according to the first weight bit and the first input bit. A first terminal of the second switch is configured to receive a first bit line signal carrying the first input bit. A second terminal of the second switch is configured to receive a first word line signal. A control terminal of the second switch is coupled to the first storage node. When the first input bit has a first logic value, each of the first bit line signal and the first word line signal has a first voltage level. When the first input bit has a second logic value, the first bit line signal has a second voltage level smaller than the first voltage level and the first word line signal has the first voltage level.

In some embodiment, when the first storage node has a third voltage level, the first current signal has a first current level, when the first storage node has a fourth voltage level and the first input bit has the first logic value, the first current signal has the first current level, and when the first storage node has the fourth voltage level and the first input bit has the second logic value, the first current signal has a second current level larger than the first current level.

In some embodiment, the logic operation is one of an AND logic operation, an OR logic operation, a NAND logic operation and an NOR logic operation, when the logic operation is the AND logic operation or the OR operation, each of the fourth voltage level and the second current level corresponds to the second logic value, and when the logic operation is the NAND logic operation or the NOR operation, each of the fourth voltage level and the first current level corresponds to the second logic value.

In some embodiment, the memory device further includes a second memory cell. The second memory cell is configured to store a second weight bit and receive a second bit line signal carrying a second input bit, to perform the logic operation with the first memory cell. The second weight bit is complementary with the first weight bit, and the second input bit is complementary with the first input bit.

In some embodiment, the second memory cell includes a third switch and a fourth switch. The third switch is configured to write the second weight bit into a second storage node. The fourth switch is configured to generate a second current signal according to the second weight bit and the second input bit. A first terminal of the fourth switch is configured to receive the second bit line signal, a second terminal of the fourth switch is configured to receive the first word line signal, and a control terminal of the fourth switch is coupled to the second storage node.

In some embodiment, the first memory cell and the second memory cell are configured to sum the first current signal and the second current signal to generate a third current signal as an output of the logic operation.

In some embodiment, the logic operation is one of an XOR logic operation and an XNOR logic operation, when the logic operation is the XOR operation, the third current signal having a first current level corresponds to the first logic value, when the logic operation is the XNOR operation, the third current signal having a second current level corresponds to the first logic value, and the second current level is larger than the first current level.

In some embodiment, the memory device further includes a second memory cell, a first amplifier, a third memory cell, a fourth memory cell and a second amplifier. The second memory cell is configured to store a second weight bit and receive a second bit line signal carrying a second input bit, to generate a second current signal. The first amplifier is coupled to a first node, and configured to generate a first voltage signal according to a third current signal. The third memory cell is configured to store a third weight bit and receive the first bit line signal, to generate a fourth current signal. The fourth memory cell is configured to store a fourth weight bit and receive the second bit line signal, to generate a fifth current signal. The second amplifier coupled to a second node, and configured to generate a second voltage signal according to a sixth current signal. The second memory cell and the first memory cell are configured to sum the second current signal and the first current signal at the first node to generate the third current signal, and the third memory cell and the fourth memory cell are configured to sum the fourth current signal and the fifth current signal at the second node to generate the sixth current signal.

In some embodiment, the memory device further includes a fifth memory cell, a sixth memory cell and a third amplifier. The fifth memory cell is configured to store a fifth weight bit and receive the first voltage signal, to generate a seventh current signal. The sixth memory cell is configured to store a sixth weight bit and receive the second voltage signal, to generate an eight current signal. The third amplifier is configured to receive a ninth current signal from a third node. The fifth memory cell and the sixth memory cell are configured to sum the seventh current signal and the eight current signal at the third node to generate the ninth current signal.

In some embodiment, the memory device further includes a second memory cell, a third memory cell, a fourth memory cell and a first amplifier. The second memory cell is configured to store a second weight bit and receive a second bit line signal carrying a second input bit, to generate a second current signal. The third memory cell is configured to store a third weight bit and receive a third bit line signal carrying a third input bit, to generate a third current signal. The fourth memory cell is configured to store a fourth weight bit and receive a fourth bit line signal carrying a fourth input bit, to generate a fourth current signal. The first amplifier is configured to receive a fifth current signal from a first node. The first memory cell, the second memory cell, the third memory cell and the fourth memory cell are configured to sum the first current signal, the second current signal, the third current signal and the fourth current signal at the first node to generate the fifth current signal, and the first weight bit, the second weight bit, the first input bit and the second input bit are complementary with the third weight bit, the fourth weight bit, the third input bit and the fourth input bit, respectively.

In some embodiment, the first memory cell, the second memory cell, the third memory cell and the fourth memory cell are configured to perform a searching logic operation to obtain a similarity between the first input bit, the second input bit and the first weight bit, the second weight bit, and when the similarity is increased, a current level of the fifth current signal is increased.

In some embodiment, the memory device further includes a second memory cell, a third memory cell, a fourth memory cell, a first amplifier and a second amplifier. The second memory cell is configured to store a second weight bit and receive a second bit line signal carrying a second input bit, to generate a second current signal. The third memory cell is configured to store a third weight bit and receive a third bit line signal carrying a third input bit, to generate a third current signal. The fourth memory cell is configured to store a fourth weight bit and receive a fourth bit line signal carrying a fourth input bit, to generate a fourth current signal. The first amplifier is configured to receive a fifth current signal from a first node. The second amplifier is configured to receive a sixth current signal from a second node. The first memory cell and the second memory cell are configured to sum the first current signal and the second current signal at the first node to generate the fifth current signal, the third memory cell and the fourth memory cell are configured to sum the third current signal and the fourth current signal at the second node to generate the six current signal, and the first weight bit, the second weight bit, the first input bit and the second input bit are complementary with the third weight bit, the fourth weight bit, the third input bit and the fourth input bit, respectively.

In some embodiment, the memory device further includes a resistor. The resistor has a resistance within a range of $10^5$ to $10^9$ ohm. The second switch is configured to receive the first bit line signal through the resistor.

The present disclosure provides an operating method of a memory device. The operating method includes: writing a first weight bit into a first storage node of a first memory cell; receiving a first bit line signal carrying a first input bit by the first memory cell; performing a logic operation according to the first input bit and the first weight bit, to generate a first current signal flowing through a first switch in the first memory cell; when the first storage node has a first voltage level, turning off the first switch and the first current signal having a first current level; when the first storage node has a second voltage level and the first bit line signal has a third voltage level, turning on the first switch and the first current signal having the first current level; and when the first storage node has the second voltage level and the first bit line signal has a fourth voltage level, turning on the first switch and the first current signal having a second current level. The second current level is larger than the first current level, and the third voltage level is larger than the fourth voltage level.

In some embodiment, the operating method further includes: inverting the first input bit to generate a second input bit; inverting the first weight bit to generate a second weight bit; writing the second weight bit into a second storage node of a second memory cell; receiving a second bit line signal carrying the second input bit by the second memory cell; generating a second current signal flowing through a second switch in the second memory cell according to the second input bit and the second weight bit; and summing the first current signal and the second current signal to generate a third current signal corresponding to an output of the logic operation.

In some embodiment, the operating method further includes: suppressing the first current signal by a resistor. The resistor is coupled in series with the first switch, and the resistor has a resistance within a range of $10^5$ to $10^9$ ohm.

In some embodiment, the operating method further includes: multiplying the first input bit and the first weight bit to generate the first current signal; multiplying a second input bit and a second weight bit by a second memory cell to generate a second current signal; and summing the first current signal and the second current signal to generate a third current signal. The logic operation is a first multiply and accumulate logic operation, and when a value of an output of the first multiply and accumulate logic operation is increased, a current level of the third current signal is increased.

In some embodiment, the operating method further includes: multiplying the first input bit and a third weight bit by a third memory cell to generate a fourth current signal; multiplying the second input bit and a fourth weight bit by a fifth memory cell to generate a fifth current signal; summing the fourth current signal and the fifth current signal to generate a sixth current signal; generating a first voltage signal and a second voltage signal according to the third current signal and the sixth current signal, respectively; and performing a second multiply and accumulate logic operation according to the first voltage signal and the second voltage signal.

In some embodiment, the operating method further includes: writing a second weight bit into a second memory cell; receiving a second bit line signal carrying a second input bit by the second memory cell; generating a second current signal by the second memory cell according to the second input bit and the second weight bit; inverting the first input bit to generate a third input bit; inverting the second input bit to generate a fourth input bit; generating a third current signal according to the third input bit; generating a fourth current signal according to the fourth input bit; and summing the first current signal, the second current signal, the third current signal and the fourth current signal to generate a fifth current signal. When a similarity between the first input bit, the second input bit and the first weight bit, the second weight bit is increased, a current level of the fifth current signal is increased.

In some embodiment, the operating method further includes: writing a second weight bit into a second memory cell; receiving a second bit line signal carrying a second input bit by the second memory cell; generating a second current signal by the second memory cell according to the second input bit and the second weight bit; inverting the first input bit to generate a third input bit; inverting the second input bit to generate a fourth input bit; generating a third current signal according to the third input bit; generating a fourth current signal according to the fourth input bit; summing the first current signal and the second current signal at a first node to generate a fifth current signal; summing the third current signal and the fourth current signal at a second node to generate a sixth current signal; and determining a similarity between the first input bit, the second input bit and the first weight bit, the second weight bit according to the fifth current signal and the sixth current signal. The first node is different from the second node.

It is to be understood that both the foregoing general description and the following detailed description are examples, and are intended to provide further explanation of the disclosure as claimed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

In the present disclosure, when an element is referred to as "connected" or "coupled", it may mean "electrically connected" or "electrically coupled". "Connected" or "coupled" can also be used to indicate that two or more components operate or interact with each other. In addition, although the terms "first", "second", and the like are used in the present disclosure to describe different elements, the terms are used only to distinguish the elements or operations described in the same technical terms. The use of the term is not intended to be a limitation of the present disclosure.

Unless otherwise defined, all terms (including technical and scientific terms) used in the present disclosure have the same meaning as commonly understood by the ordinary skilled person to which the concept of the present invention belongs. It will be further understood that terms (such as those defined in commonly used dictionaries) should be interpreted as having a meaning consistent with its meaning in the related technology and/or the context of this specification and not it should be interpreted in an idealized or overly formal sense, unless it is clearly defined as such in this article.

The terms used in the present disclosure are only used for the purpose of describing specific embodiments and are not intended to limit the embodiments. As used in the present disclosure, the singular forms "a", "one" and "the" are also intended to include plural forms, unless the context clearly indicates otherwise. It will be further understood that when used in this specification, the terms "comprises (comprising)" and/or "includes (including)" designate the existence of stated features, steps, operations, elements and/or components, but the existence or addition of one or more other features, steps, operations, elements, components, and/or groups thereof are not excluded.

Hereinafter multiple embodiments of the present disclosure will be disclosed with schema, as clearly stated, the details in many practices it will be explained in the following description. It should be appreciated, however, that the details in these practices is not applied to limit the present disclosure. Also, it is to say, in some embodiments of the present disclosure, the details in these practices are non-essential. In addition, for the sake of simplifying schema, some known usual structures and element in the drawings by a manner of simply illustrating for it.

Figure 1:
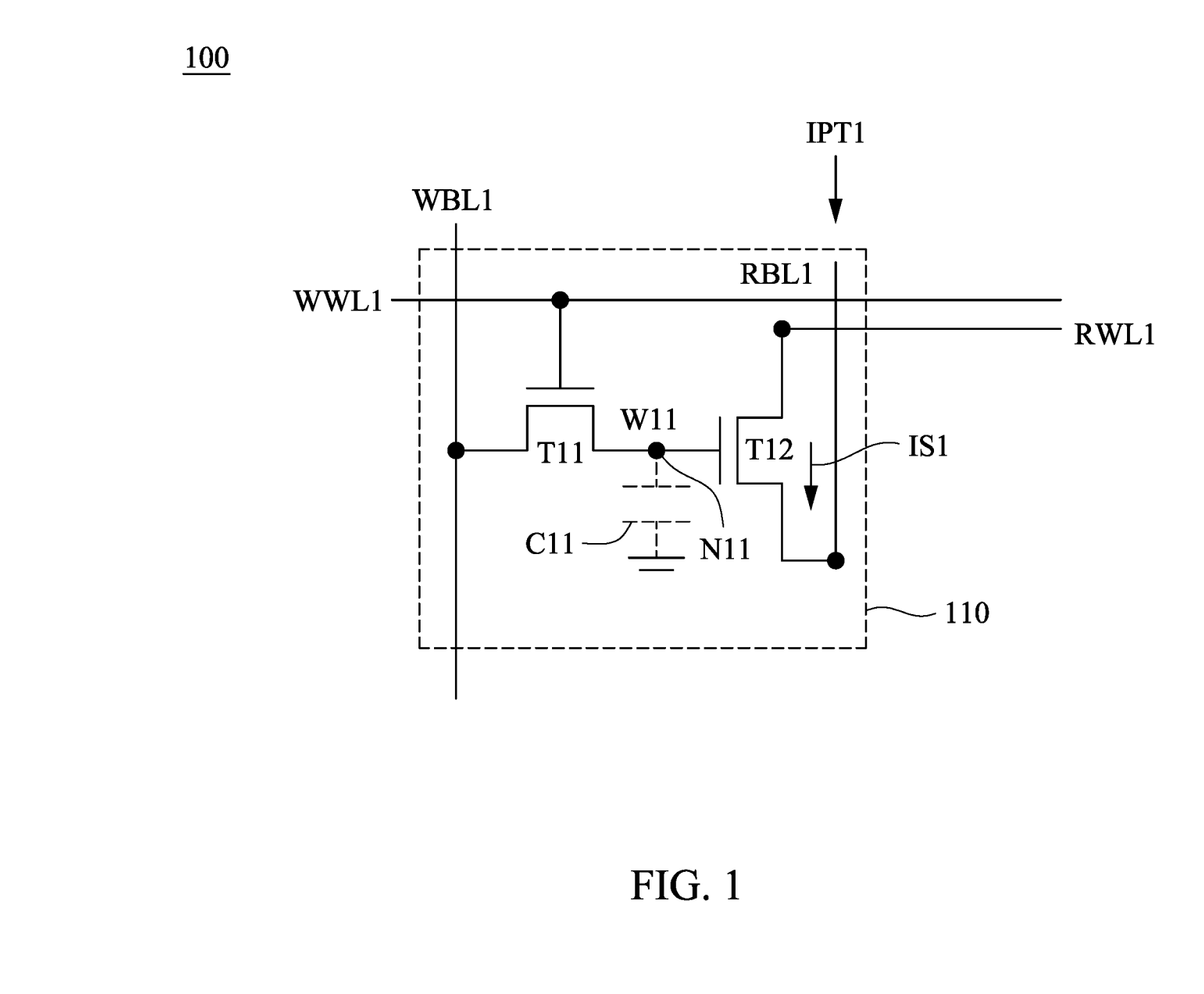
FIG. 1 is a schematic diagram of a memory device illustrated according to some embodiments of present disclosure.

FIG. 1 is a schematic diagram of a memory device 100 illustrated according to some embodiments of present disclosure. As shown in FIG. 1, the memory device 100 includes a memory cell 110. In some embodiments, the memory device 100 further includes multiple memory cells arranged in multiple columns and multiple rows (not shown in figures).

In some embodiments, the memory cell 110 is configured to receive word line signals WWL1, RWL1 and bit line signals WBL1, RBL1, and perform a logic operation according to a weight bit W11 carried by the bit line signal WBL1 and an input bit IPT1 carried by the bit line signal RBL1, to generate a current signal IS1. The weight bit and the input bit correspond to inputs of the logic operation, and a current level of the current signal IS1 correspond to an output of the logic operation.

In some embodiments, different voltage levels of the bit line signal WBL1 correspond to different logic values of the weight bit W11, and different voltage levels of the bit line signal RBL1 correspond to different logic values of the input bit IPT1.

For example, when the bit line signal WBL1 has a voltage level VWL, the weight bit W11 has one of logic values 0 and 1, and when the bit line signal WBL1 has a voltage level VWH, the weight bit W11 has another one of the logic values 0 and 1. Similarly, when the bit line signal RBL1 has a voltage level VL, the input bit IPT1 has one of logic values 0 and 1, and when the bit line signal RBL1 has a voltage level VH, the input bit IPT1 has another one of the logic values 0 and 1. In some embodiments, the voltage level VWH is larger than the voltage level VWL, and the voltage level VH is larger than the voltage level VL.

As shown in FIG. 1, the memory cell 110 includes switches T11 and T12. A terminal of the switch T11 is configured to receive the bit line signal WBL1, another terminal of the switch T11 is coupled to a storage node N11, and a control terminal of the switch T11 is configured to receive the word line signal WWL1. A terminal of the switch T12 is configured to receive the word line signal RWL1, another terminal of the switch T12 is configured to receive the bit line signal RBL1, and a control terminal of the switch T12 is coupled to the storage node N11.

In some embodiments, the switches T11 and T12 can be implemented by N-type metal oxide semiconductor (NMOS) transistors, floating gate (FG) transistors, silicon-oxide-nitride-oxide-silicon (SONOS) transistors or indium gallium zinc oxide (IGZO) transistors.

In some embodiments, the memory cell 110 can further include a capacitor C11. A terminal of the capacitor C11 is coupled to the storage node N11, and another terminal of the capacitor C11 is coupled to the ground. In various embodiments, the capacitor C11 can be implemented by one or more capacitor, and can be implemented by the parasite capacitor of the node N11.

In operations, the memory cell 110 can perform a write operation to write the weight bit W11 into the storage node N11, and can perform a read operation after the write operation to generate the current signal IS1 following through the switch T12 according to the weight bit and the input bit IPT1.

During the write operation, the word line signal WWL1 has an enable voltage level, such that the switch T11 is turned on. At this moment, the bit line signal WBL1 write the weight bit W11 into the storage node N11 through the switch T11. When the write operation ends, the capacitor C11 can store a voltage level corresponding to the weight bit W11.

During the read operation, the word line signal WWL1 has a disable voltage level, such that the switch T11 is turned off. The switch T12 is turned on or turned off according to the voltage level of the storage node N11 (that is, the logic value of the weight bit W11). When the storage node N11 has the voltage level VWL, the switch T12 is turned off, such that the current signal IS1 has a current level ILL. In some embodiments, the current level ILL is approximately equal to zero. When the storage node N11 has the voltage level VWH, the switch T12 is turned on.

Furthermore, during the read operation, the word line signal RWL1 has the voltage level VH. Correspondingly, when the switch T12 is turned on and the bit line signal RBL1 has the voltage level VH, voltage levels of two terminals of the switch T12 are the same, such that the current signal IS1 has the current level ILL. When the switch T12 is turned on and the bit line signal RBL1 has the voltage level VL, the current signal IS1 has a current level ILH which is larger than the current level ILL. In some embodiments, the current signal IS1 having the current level ILL corresponds to one of the logic values 0 and 1, and the current signal IS1 having the current level ILH corresponds to another one of the logic values 0 and 1.

In some embodiments, the memory cell is configured to perform AND logic operation. In the embodiments described above, the voltage levels VWL and VWH of the bit line signal WBL1 correspond to the logic values 0 and 1, respectively, the voltage levels VL and VH of the bit line signal RBL1 correspond to the logic values 1 and 0, respectively, and the current levels ILL and ILH of the current signal IS1 correspond to the logic values 0 and 1, respectively.

In some embodiments, the memory cell is configured to perform OR logic operation. In the embodiments described above, the voltage levels VWL and VWH of the bit line signal WBL1 correspond to the logic values 1 and 0, respectively, the voltage levels VL and VH of the bit line signal RBL1 correspond to the logic values 0 and 1, respectively, and the current levels ILL and ILH of the current signal IS1 correspond to the logic values 1 and 0, respectively.

In some embodiments, the memory cell is configured to perform NAND logic operation. In the embodiments described above, the voltage levels VWL and VWH of the bit line signal WBL1 correspond to the logic values 0 and 1, respectively, the voltage levels VL and VH of the bit line signal RBL1 correspond to the logic values 1 and 0, respectively, and the current levels ILL and ILH of the current signal IS1 correspond to the logic values 1 and 0, respectively.

In some embodiments, the memory cell is configured to perform NOR logic operation. In the embodiments described above, the voltage levels VWL and VWH of the bit line signal WBL1 correspond to the logic values 1 and 0, respectively, the voltage levels VL and VH of the bit line signal RBL1 correspond to the logic values 0 and 1, respectively, and the current levels ILL and ILH of the current signal IS1 correspond to the logic values 0 and 1, respectively.

In some approaches, a memory cell is only configured for storing data bit, and does not perform a logic operation.

Compared to above approaches, in the embodiments of present disclosure, the memory cell 110 can use the input bit IPT1 and the weight bit W11 as the inputs of the logic operation, and generate the current signal IS1 as the output of the logic operation. As a result, the memory cell 110 can perform different logic operations such as AND, OR, NAND, NOR logic operations.

Figure 2:
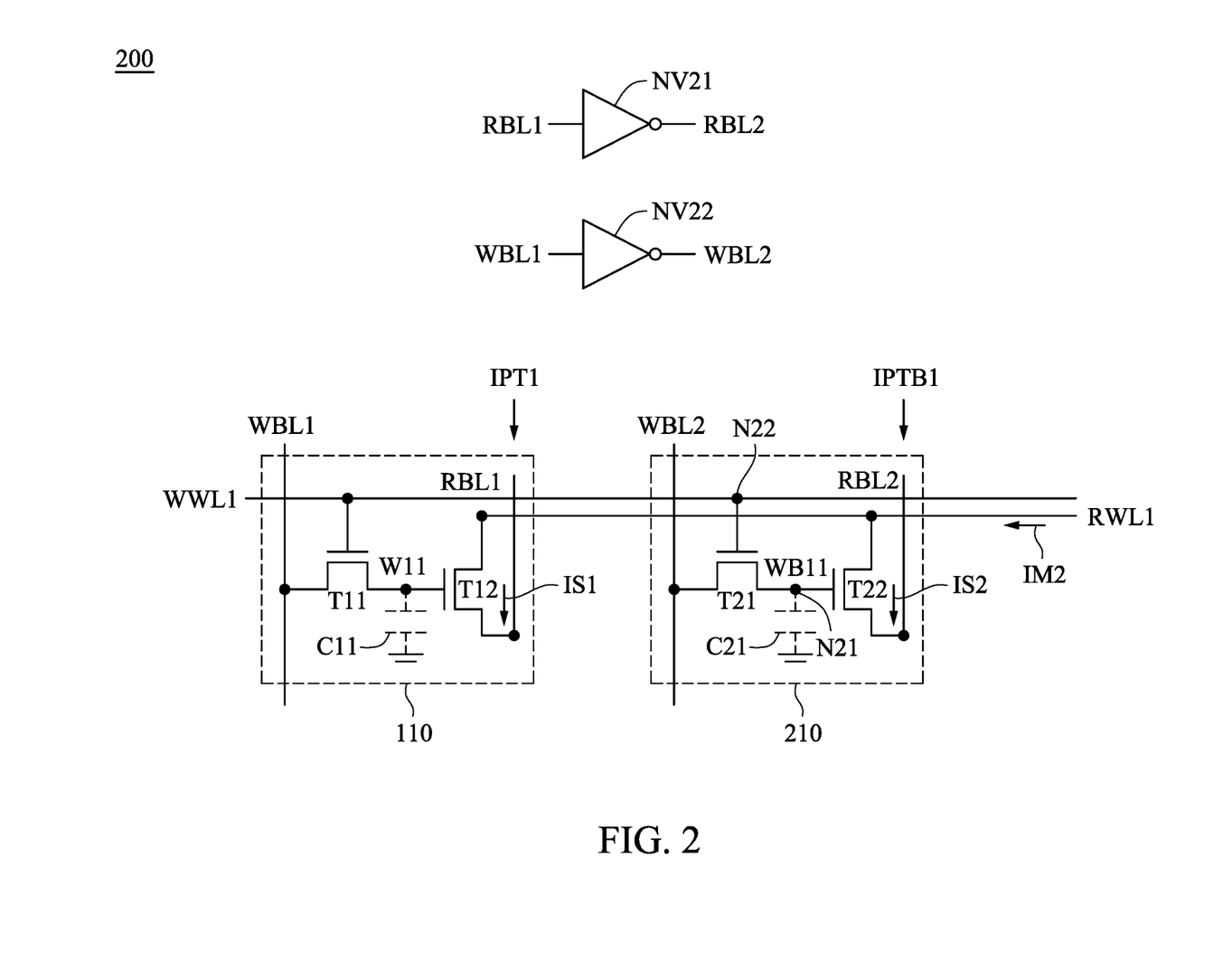
FIG. 2 is a schematic diagram of a memory device illustrated according to some embodiments of present disclosure.

FIG. 2 is a schematic diagram of a memory device 200 illustrated according to some embodiments of present disclosure. Referring to FIG. 2 and FIG. 1, the memory device 200 is an alternative embodiment of the memory device 100. Some elements of the memory device 200 follow a similar labeling convention to that of the memory device 100. For brevity, the discussion will focus more on differences between the memory device 200 and the memory device 100 than on similarities.

Compared to the memory device 100, the memory device 200 further includes a memory cell 210. The memory cell 210 is configured to receive the word line signals WWL1, RWL1 and bit line signals WBL2, RBL2, and perform the logic operation according to a weight bit WB11 carried by the bit line signal WBL2 and an input bit IPTB1 carried by the bit line signal RBL2, to generate a current signal IS2. The memory device 200 is further configured to sum the current signals IS2 and IS1 to generate a current signal IM2.

In some embodiments, the weight bits WB11 and W11 are complementary with each other, and the input bits IPTB1 and IPT1 are complementary with each other. For example, when the weight bit W11 has one of the logic values 0 and 1, the weight bit WB11 has another one of the logic values 0 and 1. When the input bit IPT1 has one of the logic values 0 and 1, the input bit IPTB1 has another one of the logic values 0 and 1.

The relationship between the logic values of the weight bit WB11 and the input bit IPTB1 and the voltage levels of the bit line signals WBL2 and RBL2 are similar to the relationship between the logic values of the weight bit W11 and the input bit IPT1 and the voltage levels of the bit line signals WBL1 and RBL1. Therefore, for brevity, some descriptions are not repeated.

In some embodiments, the memory device 200 further includes inverters NV21 and NV22. The inverter NV21 is configured to receive the bit line signal RBL1 and output the bit line signal RBL2. The inverter NV22 is configured to receive the bit line signal WBL1 and output the bit line signal WBL2. Alternatively stated, the inverter NV21 is configured to invert the input bit IPT1 to generate the input bit IPTB1, and the inverter NV22 is configured to invert the weight bit W11 to generate the weight bit WB11.

As shown in FIG. 2, the memory cell 210 includes switches T21 and T22. A terminal of the switch T21 is configured to receive the bit line signal WBL2, another terminal of the switch T21 is coupled to a storage node N21, and a control terminal of the switch T21 is configured to receive the word line signal WWL1. A terminal of the switch T22 is configured to receive the word line signal RWL1, another terminal of the switch T22 is configured to receive the bit line signal RBL2, and a control terminal of the switch T22 is coupled to a storage node N21.

In some embodiments, the memory cell 210 can further include a capacitor C21. A terminal of the capacitor C21 is coupled to the storage node N21, and another terminal of the capacitor C21 is coupled to the ground. In various embodiments, the capacitor C21 can be implemented by one or more capacitor, and can be implemented by the parasite capacitor of the node N21.

In operations, the memory cell 210 can perform a write operation to write the weight bit WB11 into the storage node N21, and can perform a read operation after the write operation to generate the current signal IS2 following through the switch T22 according to the weight bit and the input bit IPTB1.

During the write operation, the word line signal WWL1 has the enable voltage level, such that the switch T21 is turned on. At this moment, the bit line signal WBL2 write the weight bit WB11 into the storage node N21 through the switch T21. When the write operation ends, the capacitor C21 can store a voltage level corresponding to the weight bit WB11.

During the read operation, the word line signal WWL1 has the disable voltage level, such that the switch T21 is turned off. The switch T22 is turned on or turned off according to the voltage level of the storage node N21. When the storage node N21 has the voltage level VWL, the switch T22 is turned off, such that the current signal IS2 has a current level ILL. When the storage node N21 has the voltage level VWH, the switch T22 is turned on.

Furthermore, during the read operation, the word line signal RWL1 has the voltage level VH. Correspondingly, when the switch T22 is turned on and the bit line signal RBL2 has the voltage level VH, voltage levels of two terminals of the switch T22 are the same, such that the current signal IS2 has the current level ILL. When the switch T22 is turned on and the bit line signal RBL2 has the voltage level VL, the current signal IS2 has the current level ILH. In some embodiments, the current signal IS2 having the current level ILL corresponds to one of the logic values 0 and 1, and the current signal IS2 having the current level ILH corresponds to another one of the logic values 0 and 1.

Since the weight bits WB11 and W11 are complementary with each other, and the input bits IPTB1 and IPB1 are complementary with each other, the voltage levels of the bit line signals RBL1 and WBL1 are associated with the voltage levels of the bit line signals RBL2 and WBL2.

For example, when the bit line signals RBL1 and WBL1 have voltage levels VL and VWH, respectively, the bit line signals RBL2 and WBL2 have voltage levels VH and VWL, respectively. Correspondingly, the current signals IS1 and IS2 have current level ILH and ILL, respectively, such that the current signal IM2 has the current level ILH.

Similarly, when the bit line signals RBL1 and WBL1 have voltage levels VH and VWL, respectively, the bit line signals RBL2 and WBL2 have voltage levels VL and VWH, respectively. Correspondingly, the current signals IS1 and IS2 have current level ILL and ILH, respectively, such that the current signal IM2 has the current level ILH.

Similarly, when the bit line signals RBL1 and WBL1 have voltage levels VL and VWL, respectively, the bit line signals RBL2 and WBL2 have voltage levels VH and VWH, respectively. Correspondingly, each of the current signals IS1 and IS2 have current level ILL, such that the current signal IM2 has the current level ILL.

Similarly, when the bit line signals RBL1 and WBL1 have voltage levels VH and VWH, respectively, the bit line signals RBL2 and WBL2 have voltage levels VL and VWL, respectively. Correspondingly, each of the current signals IS1 and IS2 have current level ILL, such that the current signal IM2 has the current level ILL.

In some embodiments, the memory cells 110 and 210 are configured to perform the logic operation together, and use the current signal IM2 as the output of the logic operation. The current signal IM2 having the current level ILL corresponds to one of the logic values 0 and 1, and the current signal IM2 having the current level ILH corresponds to another one of the logic values 0 and 1.

In some embodiments, the memory device 200 is configured to perform XOR logic operation. In the embodiments described above, the voltage levels VWL and VWH of the bit line signal WBL1 correspond to the logic values 0 and 1, respectively, the voltage levels VL and VH of the bit line signal RBL1 correspond to the logic values 1 and 0, respectively, and the current levels ILL and ILH of the current signal IM2 correspond to the logic values 0 and 1, respectively.

In some embodiments, the memory device 200 is configured to perform XNOR logic operation. In the embodiments described above, the voltage levels VWL and VWH of the bit line signal WBL1 correspond to the logic values 0 and 1, respectively, the voltage levels VL and VH of the bit line signal RBL1 correspond to the logic values 1 and 0, respectively, and the current levels ILL and ILH of the current signal IM2 correspond to the logic values 1 and 0, respectively.

In some approaches, a memory cell is only configured for storing data bit, and does not perform a logic operation.

Compared to above approaches, in the embodiments of present disclosure, the memory device 200 can use the input bit IPT1, the weight bit W11 the input bit IPTB1 and the weight bit WB11 as the inputs of the logic operation, and generate the current signal IM2 as the output of the logic operation. As a result, the memory device 200 can perform different logic operations such as XOR, XNOR logic operations.

Figure 3:
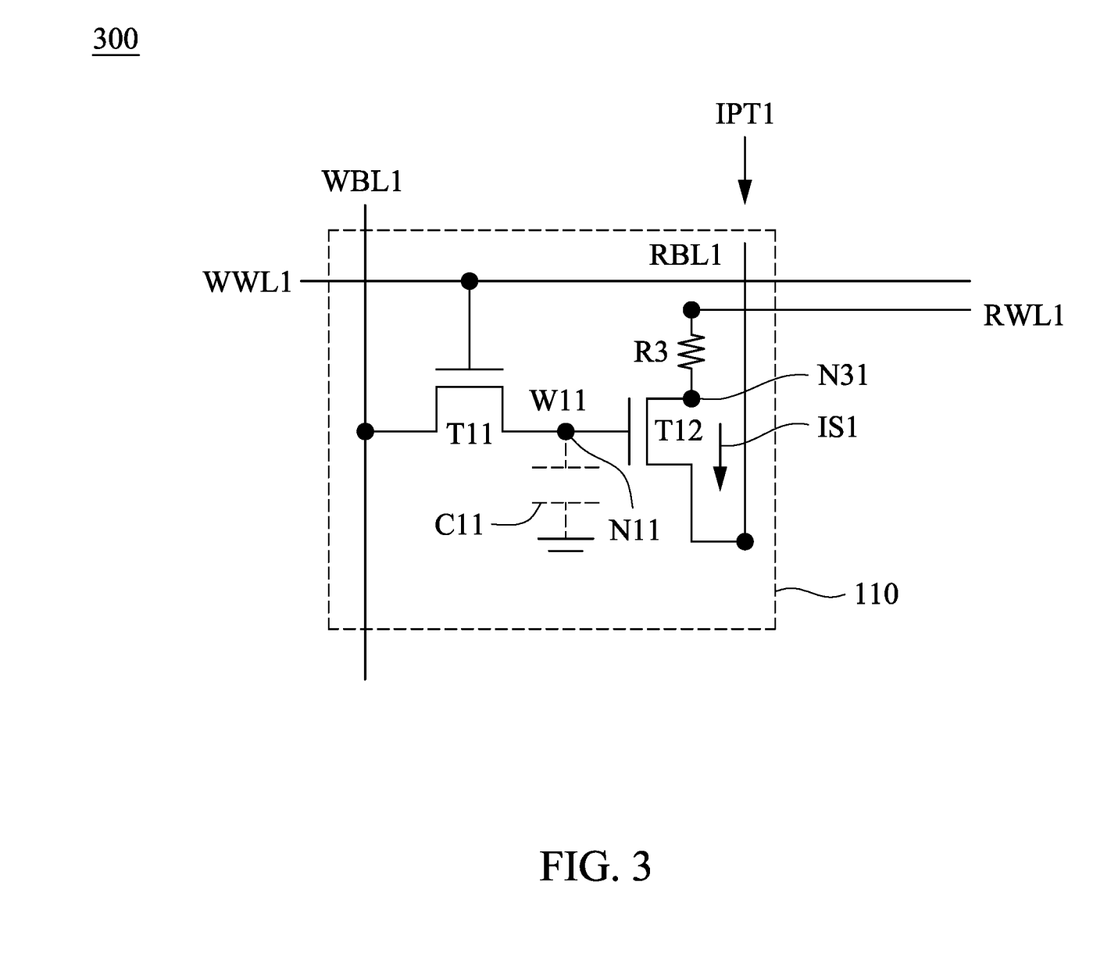
FIG. 3 is a schematic diagram of a memory device illustrated according to some embodiments of present disclosure.

FIG. 3 is a schematic diagram of a memory device 300 illustrated according to some embodiments of present disclosure. Referring to FIG. 3 and FIG. 1, the memory device 300 is an alternative embodiment of the memory device 100. Some elements of the memory device 300 follow a similar labeling convention to that of the memory device 100. For brevity, the discussion will focus more on differences between the memory device 300 and the memory device 100 than on similarities.

Compared to the memory device 100, the memory device 300 further includes a resistor R3. A terminal of the resistor R3 is configured to receive the word line signal RWL1, and another terminal of the resistor R3 is coupled to the switch T12 at a node N31. Alternatively stated, the switch T12 receives the word line signal RWL1 through the resistor R3.

In some embodiments, the resistor R3 is configured to suppress the current signal IS1, to avoid a large current signal IS1 which causes circuit operations abnormal. In various embodiments, a resistance of the resistor R3 is within a range of $10^5$ to $10^9$ ohm, and the resistor R3 can be implemented by oxide layers or poly resistors.

In some embodiments, the switch T12 has a threshold voltage level VTH, and the voltage level VWH minus the voltage level VL is larger than the threshold voltage level VTH. When the voltage level of the storage node N11 minus the voltage level of the bit line signal RBL1 is larger than the threshold voltage level VTH, the current signal IS1 has the current level ILH. In contrast, when the voltage level of the storage node N11 minus the voltage level of the bit line signal RBL1 is smaller than the threshold voltage level VTH, the current signal IS1 has the current level ILL.

Specifically, when the bit line signal RBL1 has the voltage level VL and the storage node N11 has the voltage level VWH, the current signal IS1 has the current level ILH. When the bit line signal RBL1 has the voltage level VH and the storage node N11 has the voltage level VWH, the current signal IS1 has the current level ILL. When the bit line signal RBL1 has the voltage level VH and the storage node N11 has the voltage level VWL, the current signal IS1 has the current level ILL. When the bit line signal RBL1 has the voltage level VL and the storage node N11 has the voltage level VWL, the current signal IS1 has the current level ILL.

In some embodiments, the voltage levels VL and VH of the bit line signal RBL1 correspond to the logic values 1 and 0 of the input bit IPT1, respectively, the voltage levels VWL and VWH of the storage node N11 correspond to the logic values 0 and 1 of the weight bit W11, respectively, and the current levels ILL and ILH of the current signal IS1 correspond to the logic values 0 and 1, respectively.

Figure 4:
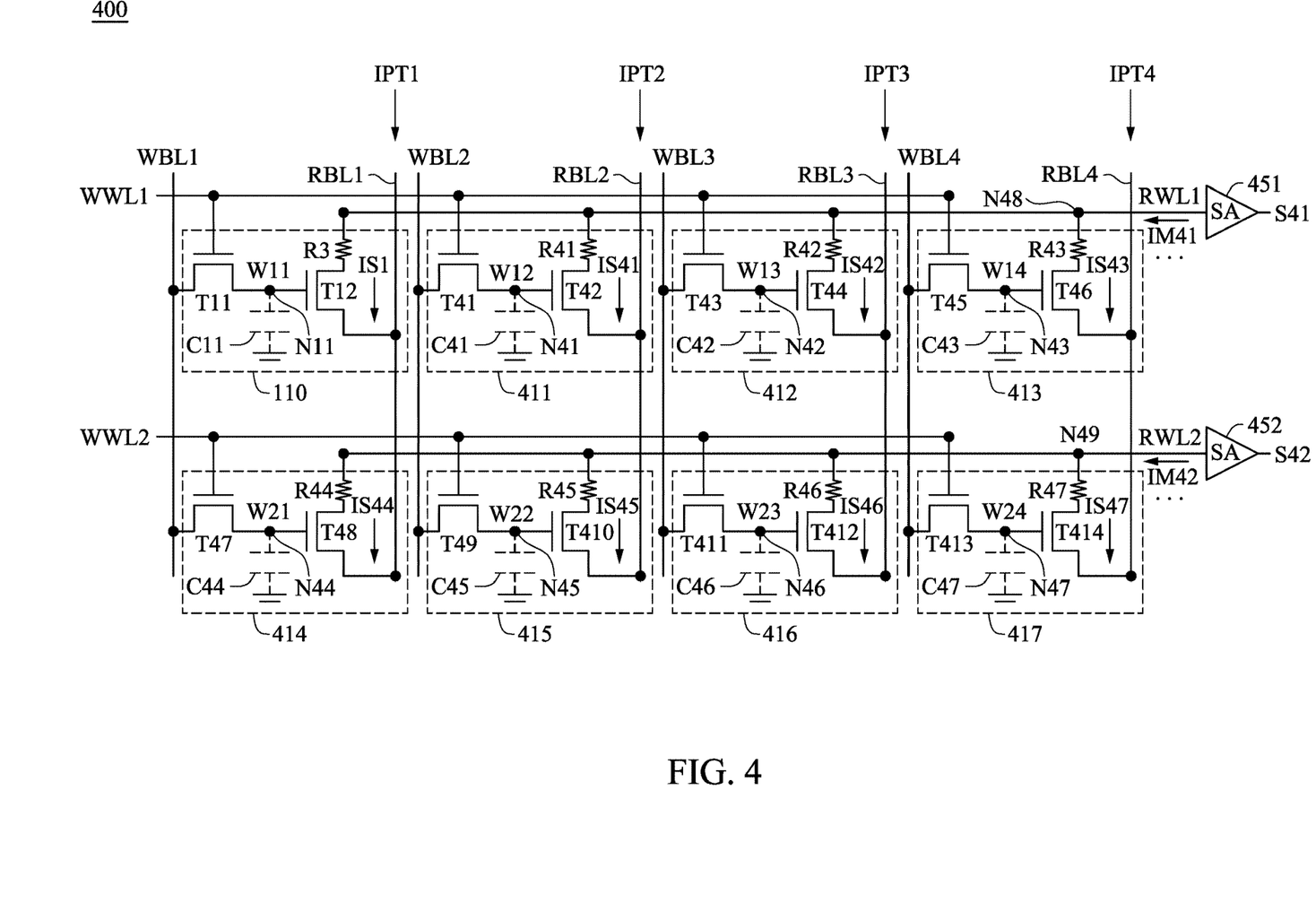
FIG. 4 is a schematic diagram of a memory device illustrated according to some embodiments of present disclosure.

FIG. 4 is a schematic diagram of a memory device 400 illustrated according to some embodiments of present disclosure. Referring to FIG. 4 and FIG. 3, the memory device 400 is an alternative embodiment of the memory device 300. Some elements of the memory device 400 follow a similar labeling convention to that of the memory device 300. For brevity, the discussion will focus more on differences between the memory device 400 and the memory device 300 than on similarities.

Compared to the memory device 300, the memory device 400 further includes memory cells 411-417 and amplifiers 451, 452. In some embodiments, the memory cells 110 and 411-413 are configured to perform a first multiply and accumulate (MAC) logic operation, to generate a current signal IM41 as an output of the first MAC logic operation. The memory cells 414-417 are configured to perform a second MAC logic operation, to generate a current signal IM42 as an output of the second MAC logic operation. The amplifier 451 is configured to generate a voltage signal S41 according to the current signal IM41. The amplifier 452 is configured to generate a voltage signal S42 according to the current signal IM42. In some embodiments, the amplifiers 451 and 452 can be implemented by sensing amplifiers.

As shown in FIG. 4, the memory cell 411 includes switches T41, T42 and a resistor R41. A terminal of the terminal of the switch T41 is configured to receive the bit line signal WBL2, another terminal of the switch T41 is coupled to a storage node N41, and a control terminal of the switch T41 is configured to receive the word line signal WWL1. A terminal of the switch T42 is coupled to the resistor R41, another terminal of the switch T42 is configured to receive the bit line signal RBL2, and a control terminal of the switch T42 is coupled to the storage node N41. A terminal of the resistor R41 is coupled to the switch T42, and another terminal of the resistor R41 is configured to receive the word line signal RWL1.

Similarly, the memory cell 412 includes switches T43, T44 and a resistor R42. A terminal of the terminal of the switch T43 is configured to receive the bit line signal WBL3, another terminal of the switch T43 is coupled to a storage node N42, and a control terminal of the switch T43 is configured to receive the word line signal WWL1. A terminal of the switch T44 is coupled to the resistor R42, another terminal of the switch T44 is configured to receive the bit line signal RBL3, and a control terminal of the switch T44 is coupled to the storage node N42. A terminal of the resistor R42 is coupled to the switch T44, and another terminal of the resistor R42 is configured to receive the word line signal RWL1.

Similarly, the memory cell 413 includes switches T45, T46 and a resistor R43. A terminal of the terminal of the switch T45 is configured to receive the bit line signal WBL4, another terminal of the switch T45 is coupled to a storage node N43, and a control terminal of the switch T45 is configured to receive the word line signal WWL1. A terminal of the switch T46 is coupled to the resistor R43, another terminal of the switch T46 is configured to receive the bit line signal RBL4, and a control terminal of the switch T46 is coupled to the storage node N43. A terminal of the resistor R43 is coupled to the switch T46, and another terminal of the resistor R43 is configured to receive the word line signal RWL1.

Similarly, the memory cell 414 includes switches T47, T48 and a resistor R44. A terminal of the terminal of the switch T47 is configured to receive the bit line signal WBL1, another terminal of the switch T47 is coupled to a storage node N44, and a control terminal of the switch T47 is configured to receive the word line signal WWL2. A terminal of the switch T48 is coupled to the resistor R44, another terminal of the switch T48 is configured to receive the bit line signal RBL1, and a control terminal of the switch T48 is coupled to the storage node N44. A terminal of the resistor R44 is coupled to the switch T48, and another terminal of the resistor R44 is configured to receive the word line signal RWL2.

Similarly, the memory cell 415 includes switches T49, T410 and a resistor R45. A terminal of the terminal of the switch T49 is configured to receive the bit line signal WBL2, another terminal of the switch T49 is coupled to a storage node N45, and a control terminal of the switch T49 is configured to receive the word line signal WWL2. A terminal of the switch T410 is coupled to the resistor R45, another terminal of the switch T410 is configured to receive the bit line signal RBL2, and a control terminal of the switch T410 is coupled to the storage node N45. A terminal of the resistor R45 is coupled to the switch T410, and another terminal of the resistor R45 is configured to receive the word line signal RWL2.

Similarly, the memory cell 416 includes switches T411, T412 and a resistor R46. A terminal of the terminal of the switch T411 is configured to receive the bit line signal WBL3, another terminal of the switch T411 is coupled to a storage node N46, and a control terminal of the switch T411 is configured to receive the word line signal WWL2. A terminal of the switch T412 is coupled to the resistor R46, another terminal of the switch T412 is configured to receive the bit line signal RBL3, and a control terminal of the switch T412 is coupled to the storage node N46. A terminal of the resistor R46 is coupled to the switch T412, and another terminal of the resistor R46 is configured to receive the word line signal RWL2.

Similarly, the memory cell 417 includes switches T413, T414 and a resistor R47. A terminal of the terminal of the switch T413 is configured to receive the bit line signal WBL4, another terminal of the switch T413 is coupled to a storage node N47, and a control terminal of the switch T413 is configured to receive the word line signal WWL2. A terminal of the switch T414 is coupled to the resistor R47, another terminal of the switch T414 is configured to receive the bit line signal RBL4, and a control terminal of the switch T414 is coupled to the storage node N47. A terminal of the resistor R47 is coupled to the switch T414, and another terminal of the resistor R47 is configured to receive the word line signal RWL2.

In some embodiments, the memory cells 411-417 further include capacitors C41-C47, respectively. The capacitors C41-C47 are coupled to the nodes N41-N47, respectively. In some embodiments, the configurations of the capacitors C41-C47 are similar with the configuration of the capacitor C11, and the configurations of the resistors R41-R47 are similar with the configuration of the resistor R3. Therefore, for brevity, some descriptions are not repeated.

As shown in FIG. 4, the bit line signals RBL1-RBL4 are configured to carry the input bits IPT1-IPT4, respectively. The bit line signal WBL1 is configured to carry weight bits W11 and W21. The bit line signal WBL2 is configured to carry weight bits W12 and W22. The bit line signal WBL3 is configured to carry weight bits W13 and W23. The bit line signal WBL4 is configured to carry weight bits W14 and W24.

In some embodiments, the relationships between logic values of the input bits IPT1-IPT4, the weight bits W11-W14, W21-W24 and the voltage levels of the bit line signals RBL1-RBL4, WBL1-WBL4 are similar with the relationships between logic values of the input bit IPT1, the weight bit W11 and the voltage levels of the bit line signals RBL1, WBL1. Therefore, for brevity, some descriptions are not repeated.

In operation, the memory cells 110 and 411-413 can perform a first write operation to write the weight bits W11-W14 into the storage nodes N11 and N41-N43, respectively. After the first write operation, the memory cells 414-417 can perform a second write operation to write the weight bits W21-W24 into the storage nodes N44-N47, respectively.

During the first write operation, the word line signals WWL1 and WWL2 have the enable voltage level and the disable voltage level, respectively, such that the switches T11, T41, T43 and T45 are turned on, and the switches T47, T49, T411 and T413 are turned off. At this moment, the bit line signals WBL1-WBL4 has the weight bits W11-W14, respectively, such that the weight bits W11-W14 can be written into the storage nodes N11 and N41-N43, respectively. When the first write operation ends, the capacitors C11 and C41-C43 can store the voltage levels corresponding to the weight bits W11-W14.

During the second write operation, the word line signals WWL1 and WWL2 have the disable voltage level and the enable voltage level, respectively, such that the switches T11, T41, T43 and T45 are turned off, and the switches T47, T49, T411 and T413 are turned on. At this moment, the bit line signals WBL1-WBL4 has the weight bits W21-W24, respectively, such that the weight bits W21-W24 can be written into the storage nodes N44-N47, respectively. When the first write operation ends, the capacitors C44-C47 can store the voltage levels corresponding to the weight bits W21-W24.

In some embodiments, after the second write operation, the memory device can further perform more write operations to write other weight bits into memory cells of other rows (not shown in figures). After the write operations described above, the memory device 400 can perform the read operation to generate the current signals IS1 and IS41-IS47 according to the weight bits W11-W14, W21-W24 and the input bits IPT1-IPT4. In which the current signals IS41-IS47 flow through the switches T42, T44, T46, T48, T410, T412 and T414, respectively.

During the read operation, each of the word line signals WWL1 and WWL2 has the disable voltage level, such that the switches T11, T41, T43, T45, T47, T49, T411 and T413 are turned off. The switches T12, T42, T44, T46, T48, T410, T412 and T414 are turned on or turned off according to the voltage level of the storage nodes N11 and N41-N47 (that is, the logic values of the weight bits W11-W14 and W21-W24), respectively.

When one or more of the storage nodes N11 and N41-N47 has the voltage level VWL, the corresponding one or more of the switches T12, T42, T44, T46, T48, T410, T412 and T414 is turned off, such that the corresponding one or more of the current signals IS1 and IS41-IS47 has the current level corresponding to the one more of the input bits IPT1-IPT4.

For example, the input bits IPT1-IPT4 have logic values 1, 1, 0, 0, respectively, in which the logic values 1 and 0 correspond to voltage levels VL and VH, respectively. The weight bits W11-W14 and W21-W24 have logic values 1, 0, 1, 0, 0, 1, 0, 1, in which the logic values 1 and 0 correspond to the voltage levels VWH and VWL, respectively.

In the example described above, in response to the logic value 1 of the weight bits W11, W13, W22 and W24, the storage nodes N11, N42, N45 and N47 have the voltage level VWH, such that the switches T12, T44, T410 and T414 are turned on. At this moment, in response to the logic value 1 of the input bits IPT1 and IPT2, the current signals IS1 and IS45 have the current level ILH. On the other hand, the current signals IS41-IS44 and IS46-IS47 have the current level ILL. At this moment, the memory device 400 sums the current signals IS1 and IS41-IS43 at the node N48, to generate the current signal IM41 having the current level ILH, and sums the current signals IS44-IS47 at the node N49, to generate the current signal IM42 having the current level ILH, such that the amplifiers 451 and 452 generate the voltage signals S41 and S42 corresponding to the current level ILH.

For another example, the input bits IPT1-IPT4 have logic values 1, 1, 1, 0, respectively. The weight bits W11-W14 and W21-W24 have logic values 1, 1, 0, 1, 0, 0, 0, 1.

In the example described above, in response to the logic value 1 of the weight bits W11, W12, W14 and W24, the storage nodes N11, N41, N43 and N47 have the voltage level VWH, such that the switches T12, T42, T43 and T414 are turned on. At this moment, in response to the logic value 1 of the input bits IPT1-IPT3, the current signals IS1 and IS41 have the current level ILH. On the other hand, the current signals IS42-IS47 have the current level ILL. At this moment, the memory device 400 sums the current signals IS1 and IS41-IS43 at the node N48, to generate the current signal IM41 having the current level 2×ILH, and sums the current signals IS44-IS47 at the node N49, to generate the current signal IM42 having the current level ILL, such that the amplifier 451 generate the voltage signal S41 corresponding to the current level 2×ILH, and the amplifier 452 generate the voltage signal S42 corresponding to the current level ILL.

In some embodiments, the voltage level of the voltage signal S41 corresponds to a summation of products of the input bits IPT1-IPT4 respective multiplying the weight bits W11-W14. For example, when IPT1×W11+IPT2×W12+IPT3×W13+IPT4×W14=1, the current signal IM41 has the current level ILH, such that the voltage signal S41 has the voltage level VL corresponding to the logic value 1. Similarly, the voltage level of the voltage signal S42 corresponds to a summation of products of the input bits IPT1-IPT4 respective multiplying the weight bits W21-W24. For example, when IPT1×W11+IPT2×W12+IPT3×W13+IPT4×

W14=0, the current signal IM42 has the current level ILL, such that the voltage signal S42 has the voltage level VH corresponding to the logic value 0.

In summary, the memory device 400 multiplies the input bits IPT1-IPT4 to the weight bits W11-W14, respectively, and sums the current signals IS1 and IS41-IS43 as the products to generate the current signal IM41. The memory device 400 also multiplies the input bits IPT1-IPT4 to the weight bits W21-W24, respectively, and sums the current signals IS44-IS47 as the products to generate the current signal IM42. As a result, the memory device 400 can perform the MAC logic operations of the input bits IPT1-IPT4 and the weight bits W11-W14, W21-W24.

Figure 5:
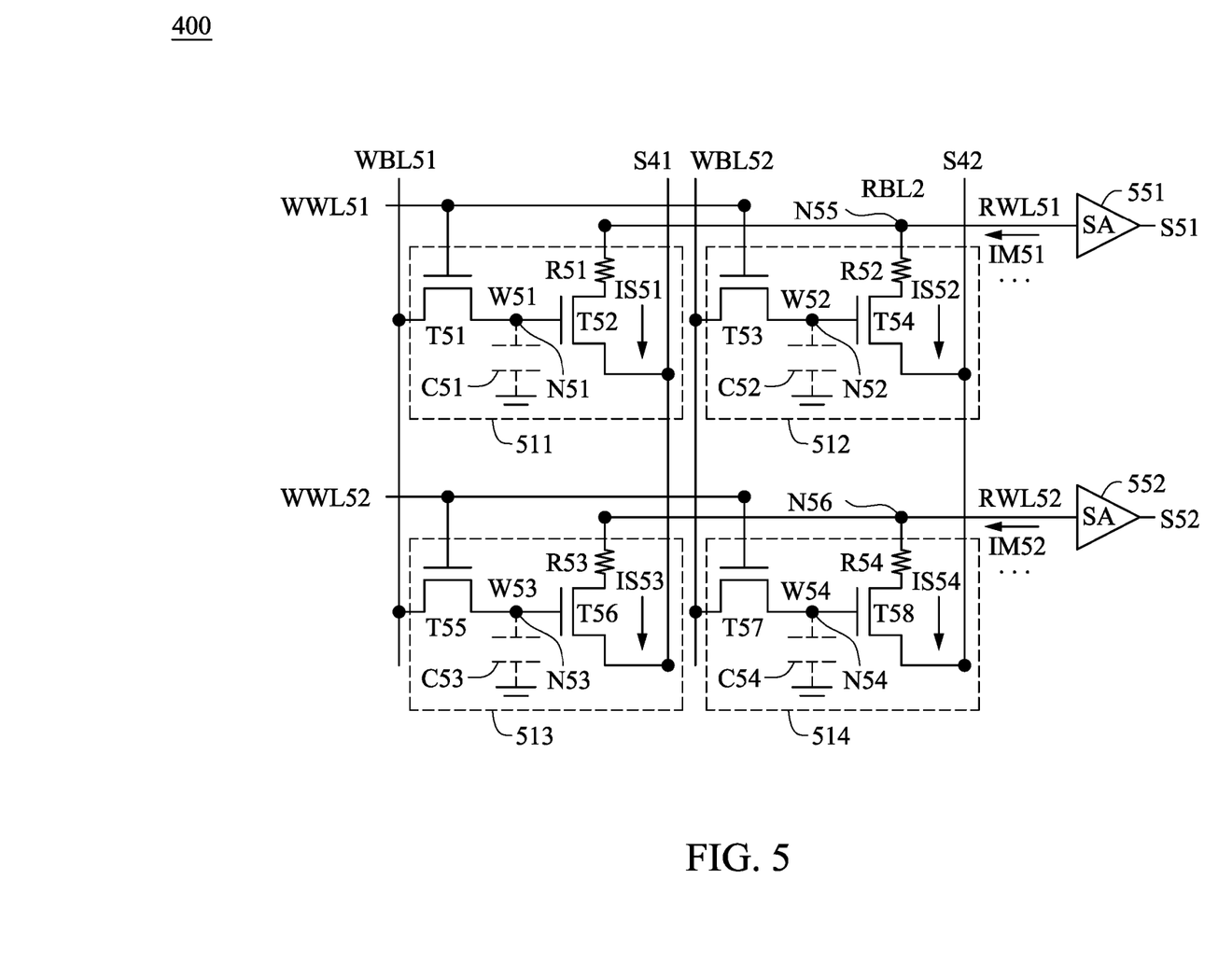
FIG. 5 is a schematic diagram of further details of the memory device illustrated according to some embodiments of present disclosure.

FIG. 5 is a schematic diagram of further details of the memory device 400 illustrated according to some embodiments of present disclosure. Referring to FIG. 5 and FIG. 4, in some alternative embodiments, the memory device 400 can further includes memory cells 511-514 and amplifiers 551, 552. The memory cells 511 and 512 are configured to perform a third MAC logic operation to the voltage signals S41 and S42, to generate a current signal IM51. The memory cells 513 and 514 are configured to perform a fourth MAC logic operation to the voltage signals S41 and S42, to generate a current signal IM52. The amplifier 551 is configured to generate a voltage signal S51 according to the current signal IM51. The amplifier 552 is configured to generate a voltage signal S52 according to the current signal IM52.

As shown in FIG. 5, the memory cell 511 includes switches T51, T52 and a resistor R51. A terminal of the terminal of the switch T51 is configured to receive a bit line signal WBL51, another terminal of the switch T51 is coupled to a storage node N51, and a control terminal of the switch T51 is configured to receive a word line signal WWL51. A terminal of the switch T52 is coupled to the resistor R51, another terminal of the switch T52 is configured to receive the voltage signal S41, and a control terminal of the switch T52 is coupled to the storage node N51. A terminal of the resistor R51 is coupled to the switch T52, and another terminal of the resistor R51 is configured to receive the word line signal RWL51.

Similarly, the memory cell 512 includes switches T53, T54 and a resistor R52. A terminal of the terminal of the switch T53 is configured to receive a bit line signal WBL52, another terminal of the switch T53 is coupled to a storage node N52, and a control terminal of the switch T53 is configured to receive the word line signal WWL51. A terminal of the switch T54 is coupled to the resistor R52, another terminal of the switch T54 is configured to receive the voltage signal S42, and a control terminal of the switch T54 is coupled to the storage node N52. A terminal of the resistor R52 is coupled to the switch T54, and another terminal of the resistor R52 is configured to receive the word line signal RWL51.

Similarly, the memory cell 513 includes switches T55, T56 and a resistor R53. A terminal of the terminal of the switch T55 is configured to receive the bit line signal WBL51, another terminal of the switch T55 is coupled to a storage node N53, and a control terminal of the switch T55 is configured to receive a word line signal WWL52. A terminal of the switch T56 is coupled to the resistor R53, another terminal of the switch T56 is configured to receive the voltage signal S41, and a control terminal of the switch T56 is coupled to the storage node N53. A terminal of the resistor R53 is coupled to the switch T56, and another terminal of the resistor R53 is configured to receive a word line signal RWL52.

Similarly, the memory cell 514 includes switches T57, T58 and a resistor R54. A terminal of the terminal of the switch T57 is configured to receive the bit line signal WBL52, another terminal of the switch T57 is coupled to a storage node N54, and a control terminal of the switch T57 is configured to receive the word line signal WWL52. A terminal of the switch T58 is coupled to the resistor R54, another terminal of the switch T58 is configured to receive the voltage signal S42, and a control terminal of the switch T58 is coupled to the storage node N54. A terminal of the resistor R54 is coupled to the switch T58, and another terminal of the resistor R54 is configured to receive the word line signal RWL52.

In some embodiments, the memory cells 511-514 further include capacitors C51-C54, respectively. The capacitors C51-C54 are coupled to the nodes N51-N54, respectively. In some embodiments, the configurations of the capacitors C51-C54 are similar with the configuration of the capacitor C11, and the configurations of the resistors R51-R54 are similar with the configuration of the resistor R3. Therefore, for brevity, some descriptions are not repeated.

In some embodiments, the bit line signal WBL51 is configured to carry weight bits W51 and W53. The bit line signal WBL52 is configured to carry weight bits W52 and W54. The memory cells 511-514 can perform the third and the fourth MAC logic operations to the weight bits W51-W54 and the voltage S41, S42 (that is, the outputs of the first and the second MAC logic operations), to generate the current signals IM51 and IM52.

In operations, the memory cell 511 and 512 can perform the first write operation to write the weight bits W51 and W52 into the storage nodes N51 and N52, respectively. After the first write operation, the memory cell 513 and 514 can perform the second write operation to write the weight bits W53 and W54 into the storage nodes N53 and N54, respectively.

During the first write operation, the word line signals WWL51 and WWL52 have the enable voltage level and the disable voltage level, respectively, such that the switches T51 and T53 are turned on, and the switches T52 and T54 are turned off. At this moment, the bit line signals WBL51 and WBL52 has the weight bits W51 and W52, respectively, such that the weight bits W51 and W52 can be written into the storage nodes N51 and N52, respectively. When the first write operation ends, the capacitors C51 and C52 can store the voltage levels corresponding to the weight bits W51 and W52.

During the second write operation, the word line signals WWL51 and WWL52 have the disable voltage level and the enable voltage level, respectively, such that the switches T51 and T53 are turned off, and the switches T52 and T54 are turned on. At this moment, the bit line signals WBL51 and WBL52 has the weight bits W53 and W54, respectively, such that the weight bits W53 and W54 can be written into the storage nodes N53 and N54, respectively. When the second write operation ends, the capacitors C53 and C54 can store the voltage levels corresponding to the weight bits W53 and W54.

After the second write operation, the memory device 400 can perform the read operation to generate the current signals IS51-IS54 according to the weight bits W51-W54 and the voltage signals S41, S42. In which the current signals IS51-IS54 flow through the switches T52, T54, T56 and T58, respectively.

During the read operation, each of the word line signals WWL51 and WWL52 has the disable voltage level, such that the switches T51, T53, T55 and T57 are turned off. The switches T52, T54, T56 and T58 are turned on or turned off according to the voltage level of the storage nodes N51-N54 (that is, the logic values of the weight bits W51-W54), respectively.

For example, when the weight bits W51-W54 have logic values 1, 0, 0, 1, respectively, the switches T52 and T58 are turned on in response to the logic value 1 of the weight bits W51 and W54, and the switches T54 and T56 are turned off in response to the logic value 0 of the weight bits W52 and W53.

At this moment, if the voltage signals S41 and S42 have the voltage level VL corresponding to the logic value 1 and the voltage level VH corresponding to the logic value 0, respectively, the current signal IS51 has the current level ILH, and the current signals IS52-IS54 have the current level ILL. Correspondingly, the memory cells 511 and 512 sum the current signals IS51 and IS52 at a node N55 to generate the current signal IM51 having the current level ILH, and memory cells 513 and 514 sum the current signals IS53 and IS54 at a node N56 to generate the current signal IM52 having the current level ILL.

In summary, the memory device 400 multiplies the logic values of the voltage signals S41 and S42 to the weight bits W51 and W52, respectively, and sums the current signals IS51 and IS52 as the products to generate the current signal IM51. The memory device 400 also multiplies the logic values of the voltage signals S41 and S42 to the weight bits W53 and W54, respectively, and sums the current signals IS53 and IS54 as the products to generate the current signal IM52. As a result, the memory device 400 can perform the MAC logic operations of the voltage signals S41 and S42 and the weight bits W51-W54.

Referring to FIG. 4 and FIG. 5, after the memory cells 110 and 411-417 perform the first and second MAC logic operations to generate the voltage signals S41 and S42, the memory cells 511-514 perform the third and fourth MAC logic operations to generate the voltage signal S51 and S52.

In application, the memory cells 110 and 411-417 can be included in a first layer of neuro network convolution layers, and the voltage signals S41 and S42 correspond to the outputs of the first layer. The memory cells 511-514 can be included in a second layer of the neuro network convolution layers, the voltage signals S41 and S42 correspond to the inputs of the second layer, and the voltage signals S51 and S52 correspond to the outputs of the second layer.

Figure 6:
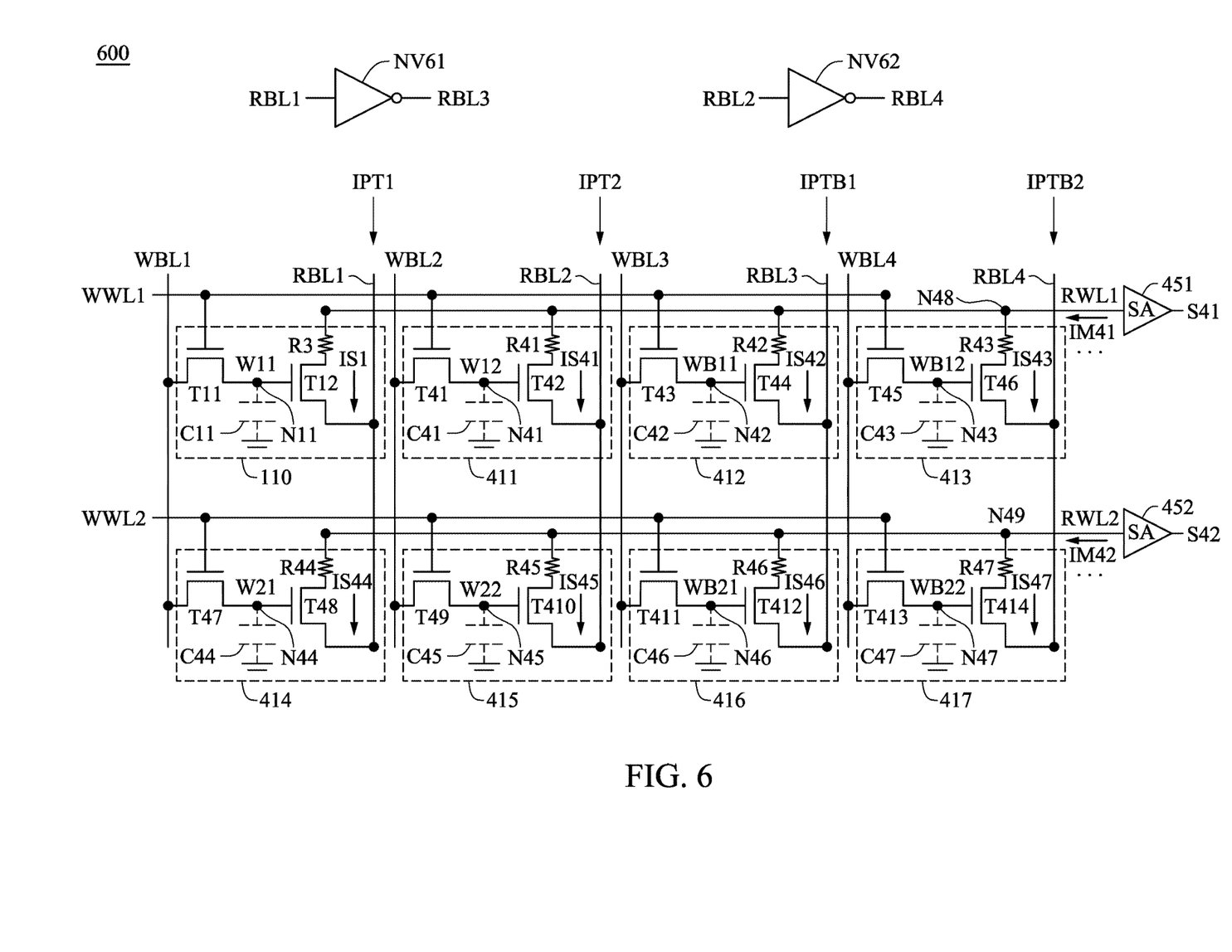
FIG. 6 is a schematic diagram of a memory device illustrated according to some embodiments of present disclosure.

FIG. 6 is a schematic diagram of a memory device 600 illustrated according to some embodiments of present disclosure. Referring to FIG. 6 and FIG. 4, the memory device 600 is an alternative embodiment of the memory device 400. Some elements of the memory device 600 follow a similar labeling convention to that of the memory device 400. For brevity, the discussion will focus more on differences between the memory device 600 and the memory device 400 than on similarities.

Compared to the embodiment shown in FIG. 4, in the embodiment shown in FIG. 6, the bit line signals RBL3 and RBL4 are configured to carry input bits IPTB1 and IPTB2, instead of the input bits IPT3 and IPT4. The bit line signal WBL3 is configured to carry weight bits WB11 and WB21, instead of the weight bits W13 and W23. The bit line signal WBL4 is configured to carry weight bits WB12 and WB22, instead of the weight bits W14 and W24. In which the input bits IPTB1, IPTB2 and the weight bits WB11, WB21, WB12, WB22 are complementary with the input bits IPT1, IPT2 and the weight bits W11, W21, W12, W22, respectively.

In some embodiments, the memory device 600 further includes inverters NV61 and NV62. The inverter NV61 is configured to receive the bit line signal RBL1 and output the bit line signal RBL3. The inverter NV62 is configured to receive the bit line signal RBL2 and output the bit line signal RBL4. Alternatively stated, the inverter NV61 is configured to invert the input bit IPT1 to generate the input bit IPTB1, and the inverter NV62 is configured to invert the input bit IPT2 to generate the input bit IPTB2.

In response to the bit line signal WBL3 carrying the weight bit WB11 and WB21 and the bit line signal WBL4 carrying the weight bit WB12 and WB22, the storage nodes N42, N43, N46 and N47 are configured to store the voltage levels corresponding to the weight bits WB11, WB12, WB21 and WB22, respectively.

In operation, the memory device 600 can perform a searching logic operation. Specifically, the memory device 600 is configured to compare the input bits and the weight bits. When similarities between the input bits and the weight bits are increased, the current levels of the current signals generated by the memory device 600 are increased.

For example, when the input bits IPT1 and IPT2 have the logic values 1 and 0, respectively, the bit line signals RBL1-RBL4 have the voltage levels VL, VH, VH, VL, respectively. If the weight bits W11 and W12 also have the logic values 1 and 0, respectively, the input bits IPT1, IPT2 and the weight bits W11, W12 have a similarity of 100%. At this moment, the storage nodes N11 and N41-N43 have voltage levels VWH, VWL, VWL and VWH, respectively. Correspondingly, the current signals IS11 and IS41-IS43 have the current levels ILH, ILL, ILL and ILH, respectively, such that the current signal IM41 has a current level 2×ILH.

For another example, when the input bits IPT1 and IPT2 have the logic values 1 and 0, respectively, and the weight bits W21 and W22 have the logic values 0 and 1, respectively, the input bits IPT1, IPT2 and the weight bits W11, W12 have a similarity of 0%. At this moment, the bit line signals RBL1-RBL4 has the voltage levels VL, VH, VH, VL, respectively, and the storage nodes N44-N47 have voltage levels VWL, VWH, VWH and VWL, respectively. Correspondingly, each of the current signals IS44-IS47 has the current level ILL, such that the current signal IM42 has the current level ILL.

For a further example, when the input bits IPT1 and IPT2 have the logic values 1 and 0, respectively, and the weight bits W21 and W22 have the logic values 1 and 1, respectively, the input bits IPT1, IPT2 and the weight bits W11, W12 have a similarity of 50%. At this moment, the bit line signals RBL1-RBL4 has the voltage levels VL, VH, VH, VL, respectively, and the storage nodes N44-N47 have voltage levels VWH, VWH, VWL and VWL, respectively. Correspondingly, the current signals IS44-IS47 have the current level ILH, ILL, ILL, ILL, respectively, such that the current signal IM42 has the current level ILH.

In summary, in response to the similarities of 0%, 50% and 100% between the input bits and the weight bits, the current signal generated by the memory device 600 has the current levels ILL, ILH and 2×ILH, respectively. As a result, the similarity between the input bits and the weight bits can be determined by the current level, to realize the searching logic operation.

Figure 7:
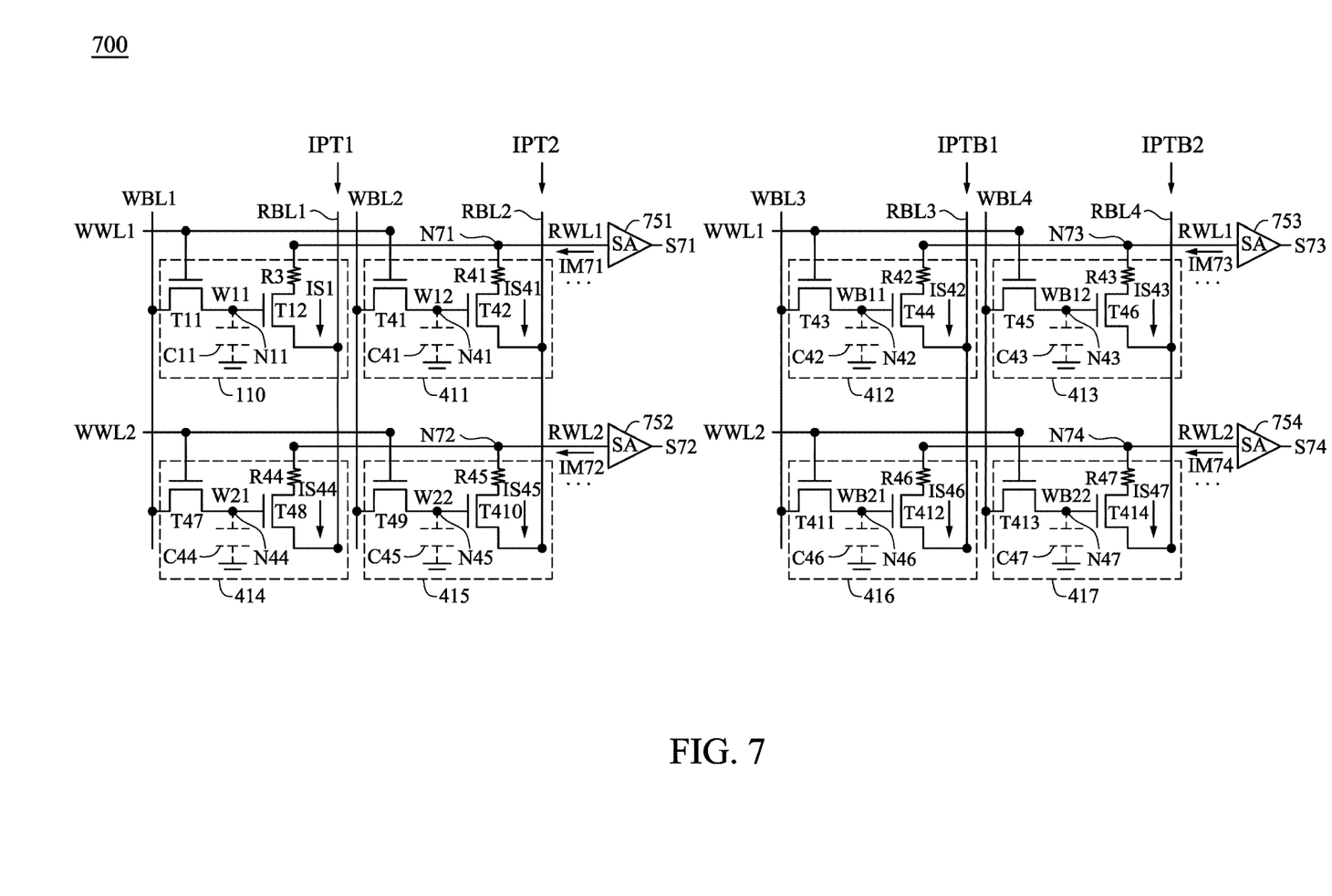
FIG. 7 is a schematic diagram of a memory device illustrated according to some embodiments of present disclosure.

FIG. 7 is a schematic diagram of a memory device 700 illustrated according to some embodiments of present disclosure. Referring to FIG. 7 and FIG. 6, the memory device 700 is an alternative embodiment of the memory device 600. Some elements of the memory device 700 follow a similar labeling convention to that of the memory device 600. For brevity, the discussion will focus more on differences between the memory device 700 and the memory device 600 than on similarities.

Compared to the memory device 600, in the memory device 700, the memory cells 110, 411, 414, 415 and the memory cells 412, 413, 416, 417 are arranged in different memory arrays. Furthermore, compared to the memory device 600, the memory device 700 further includes amplifiers 751-754 instead of the amplifiers 451 and 452.

As shown in FIG. 7, the amplifier 751 is coupled to the resistors R3 and R41 at a node N71. The amplifier 752 is coupled to the resistors R44 and R45 at a node N72. The amplifier 753 is coupled to the resistors R42 and R43 at a node N73. The amplifier 754 is coupled to the resistors R46 and R47 at a node N74.

In operation, the memory cells 110 and 411 are configured to sum the current signals IS11 and IS41 at the node N71 to generate a current signal IM71. The amplifier 751 is configured to generate a voltage signal S71 according to the current signal IM71. The memory cells 414 and 415 are configured to sum the current signals IS44 and IS45 at the node N72 to generate a current signal IM72. The amplifier 752 is configured to generate a voltage signal S72 according to the current signal IM72.

Similarly, the memory cells 412 and 413 are configured to sum the current signals IS42 and IS43 at the node N73 to generate a current signal IM73. The amplifier 753 is configured to generate a voltage signal S73 according to the current signal IM73. The memory cells 416 and 417 are configured to sum the current signals IS46 and IS47 at the node N74 to generate a current signal IM74. The amplifier 754 is configured to generate a voltage signal S74 according to the current signal IM74.

In some embodiments, when one of the current signals IM71-IM74 has the current level ILH corresponding to the logic value 1, a corresponding one of the voltage signals S71-S74 has the voltage level VL corresponding to the logic value 1. When one of the current signals IM71-IM74 has the current level ILL corresponding to the logic value 0, a corresponding one of the voltage signals S71-S74 has the voltage level VH corresponding to the logic value 0.

In some embodiments, a processor (not shown in figures) is configured to determine the similarity of the input bits IPT1, IPT2 and the weight bits W11, W12 according to the voltage signal S71 and S72, and determine the similarity of the input bits IPT1, IPT2 and the weight bits W21, W22 according to the voltage signal S73 and S74.

As shown in FIG. 7 and FIG. 6, the configurations of the memory devices 700 and 600 can achieve the searching logic operation by same or different memory array. As a result, the designing can be performed according to different specification requirements, such that the degree of freedom is increased.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A memory device, comprising a first memory cell, the first memory cell configured to perform a logic operation according to a first weight bit and a first input bit, the first memory cell comprising:
    a first switch configured to write the first weight bit into a first storage node; and
    a second switch configured to generate a first current signal according to the first weight bit and the first input bit, and
    a second memory cell configured to perform the logic operation according to a second weight bit and a second input bit to generate a second current signal,
    wherein a first terminal of the second switch is configured to receive a first bit line signal carrying the first input bit,
    a second terminal of the second switch is configured to receive a first word line signal,
    a control terminal of the second switch is coupled to the first storage node,
    when the first input bit has a first logic value, each of the first bit line signal and the first word line signal has a first voltage level,
    when the first input bit has a second logic value, the first bit line signal has a second voltage level smaller than the first voltage level and the first word line signal has the first voltage level, and
    wherein when a similarity between the first input bit, the second input bit and the first weight bit, the second weight bit is increased, a current level of a sum of the first current signal and the second current signal is increased.

2. The memory device of claim 1, wherein
    when the first storage node has a third voltage level, the first current signal has a first current level,
    when the first storage node has a fourth voltage level and the first input bit has the first logic value, the first current signal has the first current level, and
    when the first storage node has the fourth voltage level and the first input bit has the second logic value, the first current signal has a second current level larger than the first current level.

3. The memory device of claim 2, wherein the logic operation is one of an AND logic operation, an OR logic operation, a NAND logic operation and an NOR logic operation,
    when the logic operation is the AND logic operation or the OR operation, each of the fourth voltage level and the second current level corresponds to the second logic value, and
    when the logic operation is the NAND logic operation or the NOR operation, each of the fourth voltage level and the first current level corresponds to the second logic value.

4. The memory device of claim 1, wherein
    the second memory cell configured to store the second weight bit and receive a second bit line signal carrying the second input bit, to perform the logic operation with the first memory cell,
    wherein the second weight bit is complementary with the first weight bit, and
    the second input bit is complementary with the first input bit.

5. The memory device of claim 4, wherein the second memory cell comprises:
    a third switch configured to write the second weight bit into a second storage node; and a fourth switch configured to generate the second current signal according to the second weight bit and the second input bit, wherein a first terminal of the fourth switch is configured to receive the second bit line signal, a second terminal of the fourth switch is configured to receive the first word line signal, and a control terminal of the fourth switch is coupled to the second storage node.

6. The memory device of claim 5, wherein the first memory cell and the second memory cell are configured to sum the first current signal and the second current signal to generate a third current signal as an output of the logic operation.

7. The memory device of claim 6, wherein the logic operation is one of an XOR logic operation and an XNOR logic operation, when the logic operation is the XOR operation, the third current signal having a first current level corresponds to the first logic value, when the logic operation is the XNOR operation, the third current signal having a second current level corresponds to the first logic value, and the second current level is larger than the first current level.

8. The memory device of claim 1, further comprising:

a second memory cell configured to store a second weight bit and receive a second bit line signal carrying a second input bit, to generate a second current signal;

a first amplifier coupled to a first node, and configured to generate a first voltage signal according to a third current signal;

a third memory cell configured to store a third weight bit and receive the first bit line signal, to generate a fourth current signal;

a fourth memory cell configured to store a fourth weight bit and receive the second bit line signal, to generate a fifth current signal; and a second amplifier coupled to a second node, and configured to generate a second voltage signal according to a sixth current signal, wherein the second memory cell and the first memory cell are configured to sum the second current signal and the first current signal at the first node to generate the third current signal, and the third memory cell and the fourth memory cell are configured to sum the fourth current signal and the fifth current signal at the second node to generate the sixth current signal.

9. The memory device of claim 8, further comprising:

a fifth memory cell configured to store a fifth weight bit and receive the first voltage signal, to generate a seventh current signal;

a sixth memory cell configured to store a sixth weight bit and receive the second voltage signal, to generate an eight current signal; and a third amplifier configured to receive a ninth current signal from a third node, wherein the fifth memory cell and the sixth memory cell are configured to sum the seventh current signal and the eight current signal at the third node to generate the ninth current signal.

10. The memory device of claim 1, further comprising:

a second memory cell configured to store a second weight bit and receive a second bit line signal carrying a second input bit, to generate a second current signal;

a third memory cell configured to store a third weight bit and receive a third bit line signal carrying a third input bit, to generate a third current signal;

a fourth memory cell configured to store a fourth weight bit and receive a fourth bit line signal carrying a fourth input bit, to generate a fourth current signal; and a first amplifier configured to receive a fifth current signal from a first node, wherein the first memory cell, the second memory cell, the third memory cell and the fourth memory cell are configured to sum the first current signal, the second current signal, the third current signal and the fourth current signal at the first node to generate the fifth current signal, and the first weight bit, the second weight bit, the first input bit and the second input bit are complementary with the third weight bit, the fourth weight bit, the third input bit and the fourth input bit, respectively.

11. The memory device of claim 10, wherein the first memory cell, the second memory cell, the third memory cell and the fourth memory cell are configured to perform a searching logic operation to obtain a similarity between the first input bit, the second input bit and the first weight bit, the second weight bit, and when the similarity is increased, a current level of the fifth current signal is increased.

12. The memory device of claim 1, further comprising:

a second memory cell configured to store a second weight bit and receive a second bit line signal carrying a second input bit, to generate a second current signal;

a third memory cell configured to store a third weight bit and receive a third bit line signal carrying a third input bit, to generate a third current signal;

a fourth memory cell configured to store a fourth weight bit and receive a fourth bit line signal carrying a fourth input bit, to generate a fourth current signal;

a first amplifier configured to receive a fifth current signal from a first node; and a second amplifier configured to receive a sixth current signal from a second node, wherein the first memory cell and the second memory cell are configured to sum the first current signal and the second current signal at the first node to generate the fifth current signal, the third memory cell and the fourth memory cell are configured to sum the third current signal and the fourth current signal at the second node to generate the six current signal, and the first weight bit, the second weight bit, the first input bit and the second input bit are complementary with the third weight bit, the fourth weight bit, the third input bit and the fourth input bit, respectively.

13. The memory device of claim 1, further comprising:

a resistor having a resistance within a range of 105 to 109 ohm, wherein the second switch is configured to receive the first bit line signal through the resistor.

14. An operating method of a memory device, comprising:

writing a first weight bit into a first storage node of a first memory cell;

receiving a first bit line signal carrying a first input bit by the first memory cell;

performing a logic operation according to the first input bit and the first weight bit, to generate a first current signal flowing through a first switch in the first memory cell;

when the first storage node has a first voltage level, turning off the first switch and the first current signal having a first current level;

when the first storage node has a second voltage level and the first bit line signal has a third voltage level, turning on the first switch and the first current signal having the first current level; and when the first storage node has the second voltage level and the first bit line signal has a fourth voltage level, turning on the first switch and the first current signal having a second current level, inverting the first input bit to generate a second input bit; and inverting the first weight bit to generate a second weight bit; and performing the logic operation according to the second input bit and the second weight bit, to generate a second current signal flowing through a second memory cell, wherein the second current level is larger than the first current level, the third voltage level is larger than the fourth voltage level, and wherein when a similarity between the first input bit, the second input bit and the first weight bit, the second weight bit is increased, a current level of a sum of the first current signal and the second current signal is increased.

15. The operating method of claim 14, further comprising:
writing the second weight bit into a second storage node of the second memory cell;
receiving a second bit line signal carrying the second input bit by the second memory cell;
generating the second current signal flowing through a second switch in the second memory cell according to the second input bit and the second weight bit; and
summing the first current signal and the second current signal to generate a third current signal corresponding to an output of the logic operation.

16. The operating method of claim 14, further comprising:
suppressing the first current signal by a resistor,
wherein the resistor is coupled in series with the first switch, and
the resistor has a resistance within a range of 105 to 109 ohm.

17. The operating method of claim 14, further comprising:
multiplying the first input bit and the first weight bit to generate the first current signal;
multiplying the second input bit and the second weight bit by the second memory cell to generate the second current signal; and
summing the first current signal and the second current signal to generate a third current signal,
wherein the logic operation is a first multiply and accumulate logic operation, and
when a value of an output of the first multiply and accumulate logic operation is increased, a current level of the third current signal is increased.

18. The operating method of claim 17, further comprising:
multiplying the first input bit and a third weight bit by a third memory cell to generate a fourth current signal;
multiplying the second input bit and a fourth weight bit by a fifth memory cell to generate a fifth current signal;
summing the fourth current signal and the fifth current signal to generate a sixth current signal;
generating a first voltage signal and a second voltage signal according to the third current signal and the sixth current signal, respectively; and
performing a second multiply and accumulate logic operation according to the first voltage signal and the second voltage signal.

19. The operating method of claim 14, further comprising:
writing the second weight bit into the second memory cell;
receiving a second bit line signal carrying the second input bit by the second memory cell;
generating the second current signal by the second memory cell according to the second input bit and the second weight bit;
inverting the first input bit to generate a third input bit;
inverting the second input bit to generate a fourth input bit;
generating a third current signal according to the third input bit;
generating a fourth current signal according to the fourth input bit; and
summing the first current signal, the second current signal, the third current signal and the fourth current signal to generate a fifth current signal,
wherein when the similarity between the first input bit, the second input bit and the first weight bit, the second weight bit is increased, a current level of the fifth current signal is increased.

20. The operating method of claim 14, further comprising:
writing the second weight bit into the second memory cell;
receiving a second bit line signal carrying the second input bit by the second memory cell;
generating the second current signal by the second memory cell according to the second input bit and the second weight bit;
inverting the first input bit to generate a third input bit;
inverting the second input bit to generate a fourth input bit;
generating a third current signal according to the third input bit;
generating a fourth current signal according to the fourth input bit;
summing the first current signal and the second current signal at a first node to generate a fifth current signal;
summing the third current signal and the fourth current signal at a second node to generate a sixth current signal; and
determining the similarity between the first input bit, the second input bit and the first weight bit, the second weight bit according to the fifth current signal and the sixth current signal,
wherein the first node is different from the second node.

* * * * *